United States Patent [19]

Boeckmann et al.

[11] Patent Number: 5,063,639
[45] Date of Patent: * Nov. 12, 1991

[54] ZIPPERED CLOSURE FOR PACKAGES

[75] Inventors: Hugo Boeckmann; Daniel P. McDonald, both of Arlington Heights, Ill.

[73] Assignee: Zip-Pak Incorporated, Northbrook, Ill.

[*] Notice: The portion of the term of this patent subsequent to Jan. 30, 2007 has been disclaimed.

[21] Appl. No.: 483,677

[22] Filed: Feb. 23, 1990

[51] Int. Cl.$^5$ .............................................. B65D 5/54
[52] U.S. Cl. .................................. 24/30.5 R; 24/587; 156/66
[58] Field of Search .................... 383/61, 63; 206/610, 206/630; 156/66; 493/927; 428/99; 24/30.5 R, 400, 399, 587

[56] References Cited

U.S. PATENT DOCUMENTS

| | | | |
|---|---|---|---|
| 4,191,230 | 3/1980 | Ausnit | 383/61 |
| 4,246,288 | 1/1981 | Sanborn, Jr. | 24/587 X |
| 4,655,862 | 4/1987 | Christoff et al. | |
| 4,759,642 | 7/1988 | Van Erden et al. | 383/61 X |
| 4,846,585 | 7/1989 | Boeckmann et al. | 383/63 X |
| 4,896,775 | 1/1990 | Boeckmann et al. | |
| 4,925,316 | 5/1990 | Van Erden et al. | 383/63 X |

Primary Examiner—James R. Brittain
Attorney, Agent, or Firm—Hill, Van Santen, Steadman & Simpson

[57] ABSTRACT

Zippered material for packages comprising a zipper strip having longitudinally extending complementary reclosable interlockable zipper profiles with a web separating the profiles. In one aspect, the strip is notched out to the web from opposite sides at package section intervals and with limited respective areas of the web providing links connecting the sections of the strip at the notches, the links being sealed and flattened onto package making sheet material. In another aspect, the web and the material have matching lines of weakening, the web is hermetically bonded to the material and at least the line of weakening of the web is hermetically sealed to prevent leakage through the lines of weakening, but enabling tear-open separation along the lines of weakening.

21 Claims, 2 Drawing Sheets

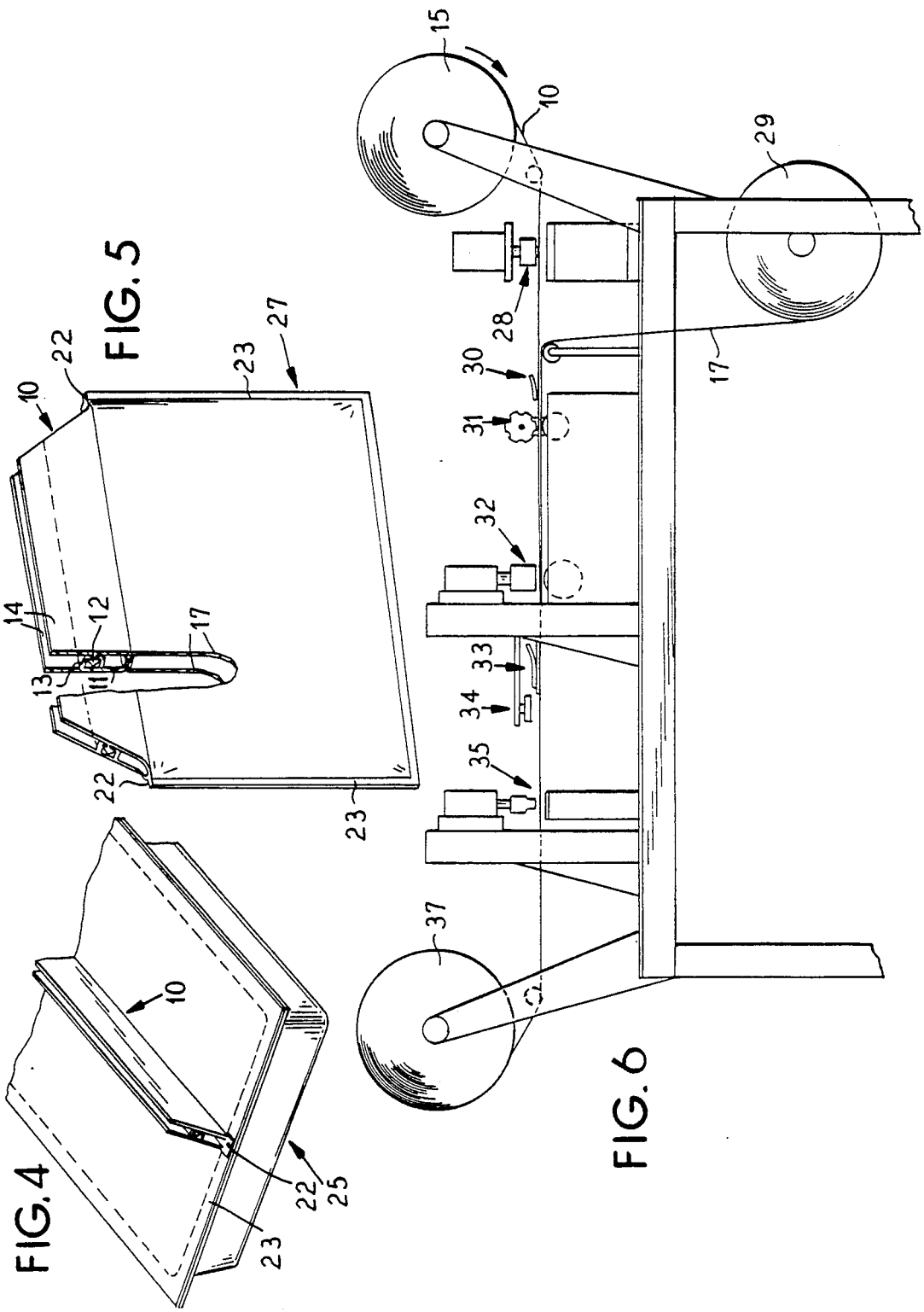

ZIPPERED CLOSURE FOR PACKAGES

BACKGROUND OF THE INVENTION

The present invention relates to improvements in the package making art and includes, without limitation, thermoformed bags and thermoformed trays, of the kind that may be used for various consumer products, but are particularly useful for food products which should be kept substantially air tight and free from leakage until the packages are opened for access to the product contents, and which packages are desirably reclosable by zipper means for protection of any remainder of product in the packages.

The indicated art is fairly well developed, but nevertheless is still susceptible of improvements for efficiency and cost effectiveness.

One problem that still exists in the production of the packages from continuous zipper equipped sheet matrial such as film, especially where the film and zipper are separately formed and then joined, resides in the difficulty in dividing the zippered film into package oriented sections, due to the greater mass of the zipper than the film.

Another problem has existed in the attainment of satisfactory sealing of the zipper against leakage where the zipper and the area of the film engaged by the zipper are provided with a weakening means such as a line of serrations which maintains the package closed in a tamper evident manner, but which enables ready opening of the package at the weakening means by legitimate owner/user.

SUMMARY OF THE PRESENT INVENTION

An important object of the present invention is to overcome the foregoing problems in a simple, efficient, cost effective manner.

Another object of the invention is to provide new and improved means for facilitating severance of package making zippered sheet material into predetermined sections.

A further object of the invention is to provide for the simple, efficient and cost effective tamper evident sealing of the zipper of zipper equipped bag making material having perforated tear-open means along the zipper.

Pursuant to the present invention there is provided zippered material for packages, comprising a zipper strip having longitudinally extending complementary reclosably interlockable zipper profiles with a web separating the profiles, the strip being notched out to the web from opposite sides at package section intervals and with limited respective areas of the web providing links connecting the sections of the strip at the notches, a sheet of package making material engaged by the web, and the links being sealed and flattened onto the sheet material.

There is also provided by the present invention a new and improved method for producing the foregoing structure.

Pursuant to the present invention there is also provided a new and improved zippered material for packages, comprising a zipper strip having longitudinally extending complementary reclosably interlockable zipper profiles with a web separating the profiles, a sheet of package making material engaged by the web, the web and the material having matching lines of weakening, the web being hermetically bonded to the mateial and at least the line of weakening of the web being hermetically sealed to prevent leakage through the lines of weakening, but enabling tear-open separation along the lines of weakening.

According to the present invention there is also provided a new and improved method of producing the immediately foregoing described structure.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 4 is a fragmentary perspective view of a tray form of package embodying the present invention;

FIG. 5 is a perspective view of a bag type of package embodying the present invention; and FIG. 6 is a schematic illustration of means for practicing the method of the present invention.

DETAILED DESCRIPTION

Figure 1:
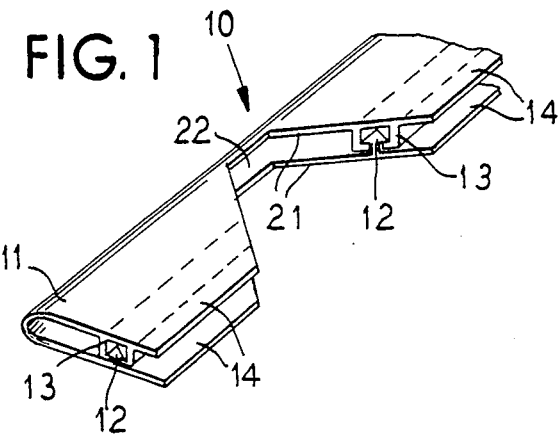
FIG. 1 is a fragmentary perspective view of a zipper strip embodying the present invention, with the profiles interlocked.

A zipper strip 10 embodying the present invention comprises a web 11 provided with longitudinally extending complementary reclosably interlockable zipper profiles 12 and 13 which, by way of example, may be of a single arrow-shaped rib and complementary groove type, or may be of multiple interlocking generally hook-shaped groove type if preferred, both forms of the zipper being conventional. Extending from the zipper profiles are respective pull flanges 14 which can be grasped and pulled apart to pull the zipper profiles apart when desired. It will be understood that the zipper strip 10 may be of substantially continuous length, extruded from suitable thermoplastic material and then rolled into supply rolls such as the supply roll 15 in FIG. 6, for storage and handling until it is desired to further process the zipper strip.

The zipper strip 10 is adapted to be attached to a continuous sheet of package making material 17 which may be of any preferred form suitable for the purpose, such as a plastic film material compatibly fusible with the web 11 of the zipper strip 10, or material having a nonfusible substrate coated with a fusible layer so that the web 11 can be fused directly to the material, or the web 11 may be attached to the sheet 17 by means of adhesive where the sheet lacks a fusible base to which the web 11 can be fused.

Regardless of the technique employed for attaching the web 11 to the sheet 17, the web 11 has longitudinally therealong, preferably centered between the profiles 12 and 13 a line of weakening 18 conveniently comprising perforations such as serrations to enable eventual tearing apart or opening of the line of weakening when it is desired to gain access into a package of which the assembly is a part. Desirably the sheet 17 has a matching line of weakening 19 also conveniently a perforated line of serrations.

Extending along the line of at least the serrations 18 in the zipper strip web 11 is a sealing stripe 20 which may be thermosealed, and which effectively hermetically seals the serrations 18 while still leaving the line of weakening provided by the serrations. Although the sealing stripe 20 may be only on the web 11, where the sheet 17 has thermofusibility compatible with the zipper strip web, the stripe may also serve as thermobonding means for attaching the zipper strip 10 to the sheet 17 and may also thermoseal the serrations 19 in the sheet while still preserving the tear-open capability of the assembly.

In order to facilitate separation of the assembly of the zipper 10 and sheet 17 into package sections, the zipper strip 10 is desirably notched out from opposite sides as shown at 21 entirely through the zipper profiles 12 and 13 to a narrow link 22 of the web 11 connecting the sections of the zipper. Through this arrangement, the links 22 can be thermosealed and flattened onto the sheet 17, whereby to facilitate package edge forming thermosealing cross seals 23 to be separated along a severance line 24.

Figure 3:
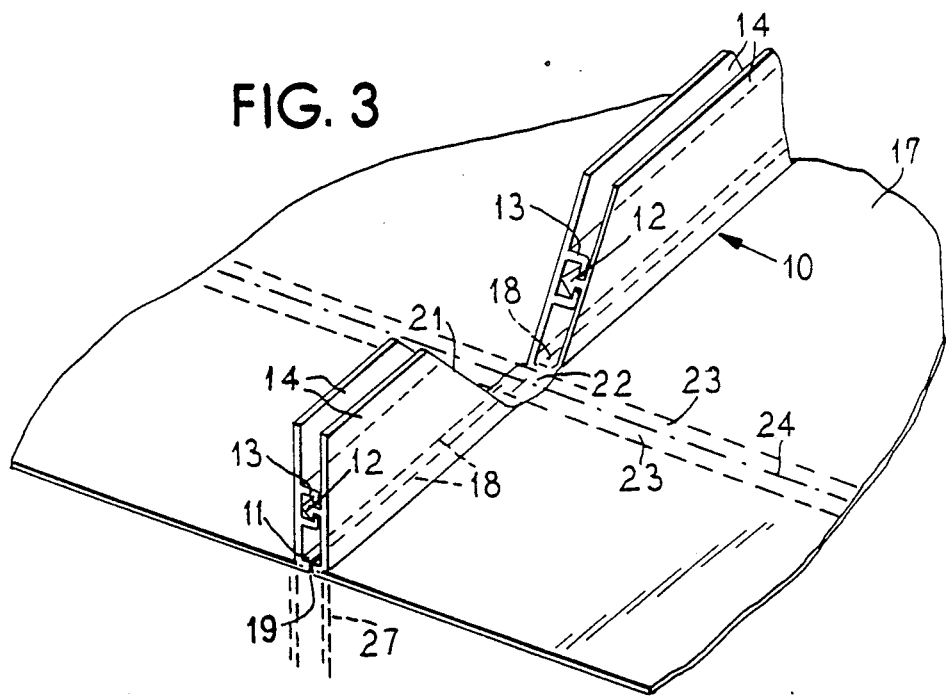
FIG. 3 is a view similar to FIG. 2, but showing the mounted zipper closed.

Conveniently the zipper equipped material 17 may become part of a desired package such as a tray type package 25 (FIG. 4) or a bag type package 27 as shown in FIG. 5. In the tray type package the material 17 may remain in the generally flat condition shown in full line in FIG. 3 and in FIG. 4, while in the bag type package, the material may be folded down as shown in dash outline in FIG. 3 and in full line in FIG. 5. In either of the packages of FIGS. 4 and 5, the cross seals 23 are at the sides of the respective packages.

Figure 2:
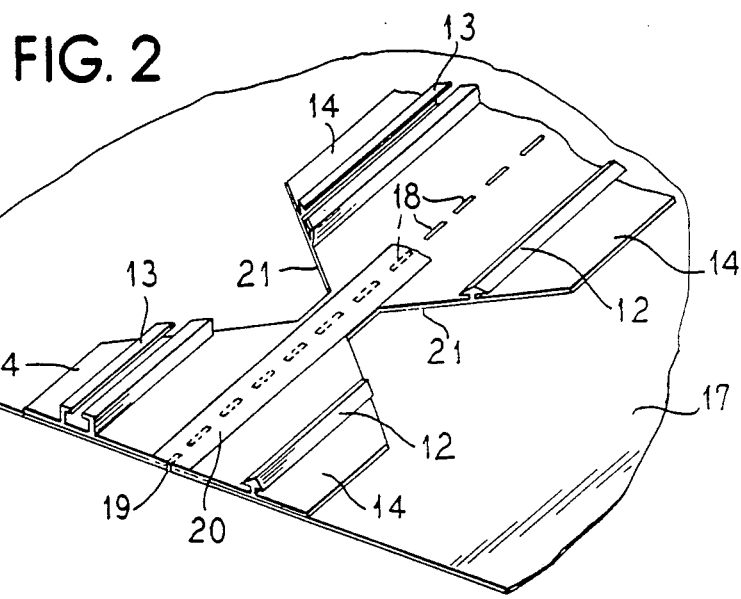
FIG. 2 is a fragmentary perspective view of the zipper strip of FIG. 1 opened and mounted on a film sheet.

FIG. 6 demonstrates a method of making the zippered sheet package making material. The zipper strip 10 thermoplastic construction is fed from the supply roll 15 to a notching punch mechanism 28 which punches out the notches 21. Downstream from the notching punch mechanism 28, the sheet material 17 in continuous film form is supplied from a supply roll 29 into underlying relation to the zipper strip 10 which is opened by suitable plow means 30 from the closed condition shown in FIG. 1 to the flattened out opened condition shown in FIG. 2. Downstream from there, the assembly is subjected to serration wheel means 31 which perforates, that is cuts, the serrations 18 and 19. Further downstream is an ultrasonic welding station 32 which effects the continuous thermosealing stripe 20 providing a leakproof surface, as described, but nevertheless allowing for easy tear-open separation along the longitudinally extending, matching weakened lines 18, 19. Where the zipper strip 10 and the material 17 are compatibly thermoplastic, the action of the ultrasonic welding may also secure the zipper strip to the sheet material. Downstream from the welding station 32, the zipper is closed by being subjected to a zipper closing plow mechanism 33 and zipper interlocking roller means 34. Thereafter, the zipper links 22 are flattened by an ultrasonic thermoseal welding device 35. Unless the assembly is to be converted immediately into packages, it may be wound into a storage and handling reel or service roll 37 for future conversion.

It will be understood that variations and modifications may be effected without departing from the spirit and scope of the novel concepts of the present invention.

We claim as our invention:

1. Zippered material for packages, comprising:
   a thermoplastic zipper strip having longitudinally extending complementary reclosably interlockable zipper profiles with a web separating the profiles;
   said strip being notched out to said web from opposite sides at package section intervals and with limited respective areas of said web providing links connecting the sections of the strip at the notches;
   a sheet of package making material engaged by the web;
   said links being sealed and flattened onto said sheet material;
   said web and said material having matching lines of weakening; and
   said web being hermetically bonded to said material and at least the line of weakening of said web being hermetically sealed to prevent leakage through said lines of weakening, but enabling tear-open separation along said lines of weakening.

2. Zippered material according to claim 1, wherein both of said zipper strip and said package making material are formed from compatibly fusible thermoplastic material, and said links and said web being thermosealed to said sheet material.

3. Zippered material according to claim 1, wherein said lines of weakening are lines of serrations.

4. Zippered material according to claim 1, wherein the hermetic sealing of said web comprises a thermoseal stripe.

5. Zippered material for packages, comprising:
   a thermoplastic zipper strip having longitudinally extending complementary reclosably interlockable zipper profiles with a web separating the profiles;
   said strip being notched out to said web from opposite sides at package section intervals and with limited respective areas of said web providing links connecting the sections of the strip at the notches;
   a sheet of package making material engaged by the web; and
   said links being sealed and flattened onto said sheet material.

6. Zippered material according to claim 5, wherein said links are thermosealed onto the sheet material.

7. Zippered material according to claim 5, wherein both of said zipper strip and said material are compatibly fusible thermoplastic material.

8. Zippered material according to claim 5, wherein said web and said sheet material have matching lines of weakening.

9. Zippered material according to claim 8, wherein said web is bonded to said sheet material, and at least the line of weakening along said web is hermetically sealed.

10. Zippered material for packages, comprising:
    a thermoplastic zipper strip having longitudinally extending complementary reclosably interlockable zipper profiles with a web separating the profiles;
    a sheet of package making material engaged by said web;
    said web and said material having matching lines of weakening;
    said web being hermetically bonded to said material and at least the line of weakening of said web being hermetically sealed to prevent leakage through said lines of weakening, but enabling tear-open separation along said lines of weakening;
    said hermetic sealing of said lines of weakening comprising a thermosealed stripe;
    said thermosealed stripe on said web also effecting sealing of said web to said sheet material.

11. A method of making zippered material for packages comprising:
   providing a zipper strip having longitudinally extending complementary reclosably interlockable zipper profiles with a web separating the profiles;
   notching said strip to said web from opposite sides at package section intervals and with limited respective areas of said web providing links connecting the sections of the strip at the notches;
   providing a sheet of package making material and engaging said web thereon;
   sealing and flattening said links onto said sheet material;
   providing said web and said material with matching lines of weakening; and
   hermetically sealing said web to said material and hermetically sealing at least the line of weakening of said web to prevent leakage through said lines of weakening, but enabling tear-open separation along said lines of weakening.

12. A method according to claim 11, comprising providing both of said zipper strip and said package making material in the form of compatibly fusible thermoplastic material, and thermosealing said links and said web to said sheet material.

13. A method according to claim 11, comprising forming said lines of weakening as lines of serrations.

14. A method according to claim 11, comprises hermetically sealing said web as a thermoseal stripe.

15. A method according to claim 11, which comprises feeding said zipper strip from a supply source with said profiles interlocked, after effecting said notching supplying said sheet material into joining relation with said web, opening the zipper by separating said profiles, then providing said lines of weakening of the web and the material, thereafter hermetically sealing said line of weakening of said web and hermetically sealing said web to said sheet, closing said zipper by interlocking said profiles, and then sealing and flattening said links onto said sheet material.

16. A method according to claim 15, which comprises finally winding the zippered material into a service roll.

17. A method of making zippered material for packages, comprising:
   providing a zipper strip having longitudinally extending complementary reclosably interlockable zipper profiles with a web separating the profiles;
   notching said strip to said web from opposite sides at package section intervals and with limited respective areas of said web providing links connecting the sections of the strip at the notches;
   providing a sheet of package making material and engaging said web thereon; and
   sealing and flattening said links onto said sheet material.

18. A method according to claim 17, comprising thermosealing said links onto the sheet material.

19. A method according to claim 17, comprising providing both of said zipper strip and said material as compatibly fusible thermoplastic material.

20. A method according to claim 17, comprising forming said web and said sheet material with matching lines of weakening.

21. Zippered material according to claim 20, comprising bonding said web to said sheet material, and hermetically sealing at least the line of weakening along said web.

* * * * *